United States Patent
An et al.

(10) Patent No.: US 8,387,243 B2
(45) Date of Patent: Mar. 5, 2013

(54) METHOD FOR MANUFACTURING MULTISTAGE EXHAUST TURBOCHARGER

(75) Inventors: Byeongil An, Kanagawa (JP); Takashi Shiraishi, Kanagawa (JP); Toru Kikuchi, Kanagawa (JP); Mamoru Wakita, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 910 days.

(21) Appl. No.: 11/989,284

(22) PCT Filed: Aug. 3, 2007

(86) PCT No.: PCT/JP2007/065677
§ 371 (c)(1),
(2), (4) Date: Mar. 10, 2008

(87) PCT Pub. No.: WO2008/018577
PCT Pub. Date: Feb. 14, 2008

(65) Prior Publication Data
US 2010/0126016 A1 May 27, 2010

(30) Foreign Application Priority Data
Aug. 10, 2006 (JP) ................................ 2006-218095

(51) Int. Cl.
*B21K 3/00* (2006.01)
(52) U.S. Cl. .............. 29/888.01; 29/888.012; 29/889.2; 29/889.21; 29/889.22; 29/890.08; 60/612
(58) Field of Classification Search ............... 29/888.01, 29/888.012, 889.2, 889.21, 889.22, 890.08; 60/612
See application file for complete search history.

(56) References Cited

U.S. PATENT DOCUMENTS

| | | | | |
|---|---|---|---|---|
| 4,783,959 A | * | 11/1988 | Sickels | 60/299 |
| 6,256,990 B1 | * | 7/2001 | Itoh | 60/597 |
| 6,378,308 B1 | | 4/2002 | Pflüger | |
| 2003/0159442 A1 | | 8/2003 | Huter et al. | |

FOREIGN PATENT DOCUMENTS

| | | |
|---|---|---|
| JP | 59-082526 | 5/1984 |
| JP | 2002-512337 | 4/2002 |
| JP | 2003-531996 | 10/2003 |
| JP | 2005-344638 | 12/2005 |
| WO | WO 2004101971 A1 * | 11/2004 |

OTHER PUBLICATIONS

Chinese Office Action (together with English translation) issued Oct. 9, 2009 in corresponding Chinese Application No. 200780000783.1.

* cited by examiner

*Primary Examiner* — Derris Banks
*Assistant Examiner* — Azm Parvez
(74) *Attorney, Agent, or Firm* — Wenderoth, Lind & Ponack, L.L.P.

(57) ABSTRACT

A method of manufacturing a multistage exhaust turbocharger having a high-pressure stage turbocharger and a low-pressure stage turbocharger includes providing a high-pressure turbine housing of the high-pressure stage turbocharger, the high-pressure turbine housing being integrally formed with the exhaust manifold by casting or welding, assembling constituent parts of the high-pressure stage turbocharger using the high-pressure turbine housing as a reference, after the assembling constituent parts of the high-pressure stage turbocharger, attaching the low-pressure stage turbocharger to the high-pressure stage turbocharger by attaching a low-pressure turbine housing to a low-pressure turbine connection flange, and after the attaching the low-pressure stage turbocharger, attaching an air supply channel to connect between a supply air outlet of the low-pressure stage turbocharger and a supply air inlet of the high-pressure stage turbocharger, wherein the low-pressure turbocharger is disposed below the high-pressure turbocharger.

8 Claims, 7 Drawing Sheets

METHOD FOR MANUFACTURING MULTISTAGE EXHAUST TURBOCHARGER

TECHNICAL FIELD

The present invention relates to a method for manufacturing a multistage exhaust turbocharger for an internal combustion engine, the turbocharger comprising a high-pressure stage turbocharger having a high-pressure turbine drivable by exhaust gas from the engine and a low-pressure stage turbocharger having a low-pressure turbine drivable by exhaust gas from the high-pressure turbine, the turbochargers being arranged sequentially in a flow path of the exhaust gas, and supply air for the engine pressurized by a low-pressure compressor of the low-pressure stage turbocharger being supplied via an air supply channel to a high-pressure compressor of the high-pressure stage turbocharger to be further pressurized by the high-pressure compressor.

BACKGROUND ART

In recent years, in the field of on-vehicle engines, particularly on-vehicle diesel engines, a multistage (two-stage) exhaust turbo-charging system has been adopted, in which a high-pressure stage turbocharger having a high-pressure turbine drivable by exhaust gas from the exhaust manifold of the engine and a low-pressure stage turbocharger having a low-pressure turbine drivable by exhaust gas from the high-pressure turbine are arranged sequentially in the flow path of the exhaust gas, and supply air for the engine pressurized by a low-pressure compressor of the low-pressure stage turbocharger is supplied via an air supply channel to a high-pressure compressor of the high-pressure stage turbocharger to be further pressurized by the high-pressure compressor and charged to the engine.

With an engine equipped with a multistage exhaust turbocharger as mentioned above, stable operation of the engine with high turbo-charging efficiency is attained, by increasing supper charge pressure in a low and middle speed operating range of the engine by performing two-stage supercharging by allowing both the high pressure stage and low-pressure stage turbocharger to operate, and by performing single-stage supercharging in a high speed operating range of the engine by allowing only the low-pressure stage turbocharger to operate by allowing the exhaust gas and supply air to bypass the high-pressure stage turbocharger.

This type of two-stage exhaust turbocharger is known for example from US 2003/0159442 A1, U.S. Pat. No. 6,378,308 B1, and JP 59-82526.

The two-stage exhaust turbocharger disclosed in US 2003/0159442 A1 (patent literature 1) includes a high-pressure stage exhaust turbocharger and a low-pressure stage exhaust turbocharger arranged compactly so that it is applicable to an on-vehicle engine mounted on a narrow engine room of a vehicle. The high-pressure stage and low-pressure stage turbochargers are arranged three dimensionally with the rotation axis of each turbocharger parallel to each other, and the exhaust gas outlet side of the turbine of the high pressure stage turbocharger is connected to the exhaust inlet side of the turbine of the low pressure stage turbocharger by an exhaust channel and the supply air outlet side of the compressor of the low pressure stage turbocharger is connected to supply air inlet side of the high pressure stage turbocharger by an air supply channel.

A comparatively large installation space is required in the engine room to install an engine equipped with a two-stage exhaust turbocharger of this type because it is inevitably increased in bulk as compared with a single-stage one.

It is demanded in the case of on-vehicle engine to reduce the bulk of the two-stage exhaust turbocharger as far as possible in order to mount an engine equipped with a two-stage exhaust turbocharger in the conventionally narrow engine room of the vehicle.

The two-stage exhaust turbocharger disclosed in the patent literature 1 is designed to meet the demand, however, there remains room for further improvement.

According to the art of the patent literature 1, the two-stage turbocharger is mounted compactly by arranging the high pressure stage and low pressure stage turbocharger three dimensionally with the rotation axis of each turbocharger parallel to each other, however, because the exhaust turbines are connected via the exhaust gas channel and the compressors are connected via air supply channel, two connecting operations are required, which result in increased assembling man-hours.

Particularly, as the high-pressure turbine and low-pressure turbine are connected by the exhaust gas channel in which exhaust gas of high temperature flows, the exhaust gas channel, gasket, and bolts are required, so number of parts increases.

Further, it is required to perform the connecting work such that perfect sealing of high pressure, high temperature exhaust gas is ensured, so assembling man-hours increase further.

In addition, as the connection of the turbochargers are performed by two connecting channels of the exhaust gas channel and air supply channel, volume occupied by the two-stage turbocharger increases, and mounting of an engine equipped with the two-stage exhaust turbocharger in a narrow engine room of a vehicle is not facilitated.

BRIEF DESCRIPTION OF THE INVENTION

The present invention was made in light of the problems in conventional art, and the object is to provide a method of manufacturing a multistage exhaust turbocharger having a high-pressure stage turbocharger and a low-pressure stage turbocharger reduced in pipe connection between the turbochargers thereby reducing the bulk of the multistage exhaust turbocharger, the number of parts for the connection, and assembling man-hours, and facilitating the mounting of an engine equipped with the multistage exhaust turbocharger in a narrow engine room of a vehicle.

To attain the object, the present invention proposes a method for manufacturing a multistage exhaust turbocharger for an internal combustion engine including a high-pressure stage turbocharger having a high-pressure turbine drivable by exhaust gas from an exhaust manifold of the engine and a low-pressure stage turbocharger having a low-pressure turbine drivable by exhaust gas flowed out from the high-pressure turbine after driving the turbine, the turbochargers being arranged sequentially in the flow path of the exhaust gas of the engine, supply air for the engine pressurized by a low-pressure compressor of the low-pressure stage turbocharger being supplied via an air supply channel to a high-pressure compressor of the high-pressure stage turbocharger to be further pressurized by the high-pressure compressor, wherein a high-pressure turbine housing of said high-pressure stage turbocharger is formed integral with said exhaust manifold by casting or welding, constituent parts of said high-pressure stage turbocharger are assembled using said high-pressure turbine housing as a reference, then said low-pressure stage turbocharger is attached to said high-pressure stage turbocharger by attaching said low-pressure turbine housing to a low-pressure turbine connection flange provided at an exhaust outlet side of said high-pressure stage turbocharger, and then an air supply channel is attached to connect between a supply air outlet of said low-pressure stage turbocharger and a supply air inlet of said high-pressure stage turbocharger.

In the invention, it is preferable that the high-pressure stage turbocharger includes a high-pressure compressor cover for accommodating the high-pressure compressor and an exhaust gas guide member which is connected to the high-pressure turbine housing at its one end and has a the low-pressure turbine connection flange at its other end side, the high-pressure stage turbocharger and the low-pressure stage turbocharger are connected by connecting the low-pressure turbine housing to the low-pressure turbine connection of the exhaust gas guide member, further a supply air outlet of a low-pressure compressor cover of the low-pressure stage turbocharger and a supply air inlet of the high-pressure compressor cover of the high-pressure stage turbocharger are connected by a supply air channel.

According to the invention, the exhaust manifold formed integral with the high-pressure turbine housing is attached to one side of the engine, the low-pressure turbocharger is located below the high-pressure turbocharger at one side of the engine and attached directly to the exhaust gas passage of the high-pressure stage turbocharger, and the compressor sides of the low-pressure stage turbocharger and high-pressure stage turbocharger are connected by the air supply channel, so the multistage exhaust turbocharger is composed on one side of the engine effectively utilizing the space at the one side of the engine. As the exhaust manifold attached with the high-pressure stage turbocharger is first fastened to the engine and then the low-pressure stage turbocharger is attached to the engine, a relatively light sub-assembly of the exhaust manifold and the relatively small high-pressure stage turbocharger is attached to one side of the engine and then the relatively large and heavy low-pressure stage turbocharger is attached to the sub-assembly already attached to the engine, the attaching operation is facilitated, resulting in decreased man-hours of attaching the two-stage turbocharger to the engine.

According to the invention, by assembling the constituent parts of the high-pressure turbocharger to the high-pressure turbine housing formed integral with the exhaust manifold, the assembling of the high-pressure turbocharger is facilitated, and by connecting the exhaust turbine sides, where high-pressure high temperature exhaust gas flows, of the high-pressure stage turbocharger and low-pressure stage turbocharger directly by flange connection without using piping as is the case in the prior art, the connecting operation of the two turbochargers is simplified as compared with the prior art, resulting in decreased assembling man-hours of the multistage exhaust turbocharger.

According to the invention, parts for connecting the exhaust turbine sides such as piping, gaskets, and bolts can be eliminated, and the number of parts is reduced, and as connection of the high-pressure and low-pressure stage turbochargers with piping is reduced to only one, i.e. the connection with the air supply channel 21, as compared with two piping connections of the prior two-stage exhaust turbocharger, bulk of the two-stage exhaust turbocharger device of the invention is reduced and mounting of an engine equipped with the two-stage exhaust turbocharger in a narrow engine room of a vehicle is facilitated.

Further, according to the invention, the exhaust manifold formed integral with the high-pressure turbine housing is attached to one side of the engine, the low-pressure turbocharger is located below the high-pressure turbocharger at one side of the engine and attached directly to the exhaust gas passage of the high-pressure stage turbocharger, so the multistage exhaust turbocharger can composed on one side of the engine effectively utilizing the space at the one side of the engine, and as a relatively light sub-assembly of the exhaust manifold and the relatively small high-pressure stage turbocharger is first attached to one side of the engine and then the relatively large and heavy low-pressure stage turbocharger is attached to the sub-assembly already attached to the engine, the attaching operation is facilitated resulting in decreased man-hours.

DETAILED DESCRIPTION OF THE INVENTION

Preferred embodiments of the present invention will now be detailed with reference to the accompanying drawings. It is intended, however, that unless otherwise specified, dimensions, materials, relative positions and so forth of the constituent parts in the embodiments shall be interpreted as illustrative only not as limitative of the scope of the present invention.

The First Embodiment

Figure 1:
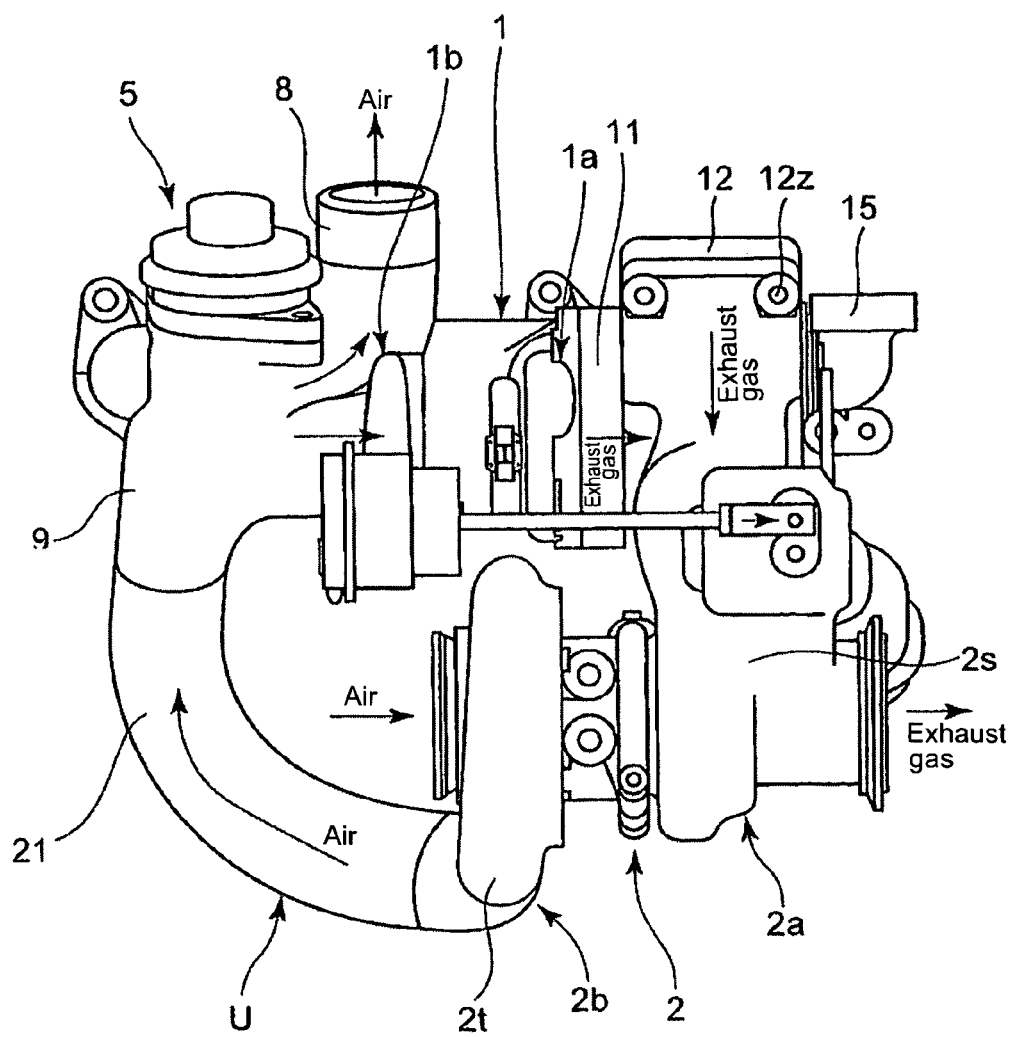
FIG. 1 is a side elevation showing the total construction of the first embodiment of the two-stage exhaust turbocharger according to the invention.
Figure 2:
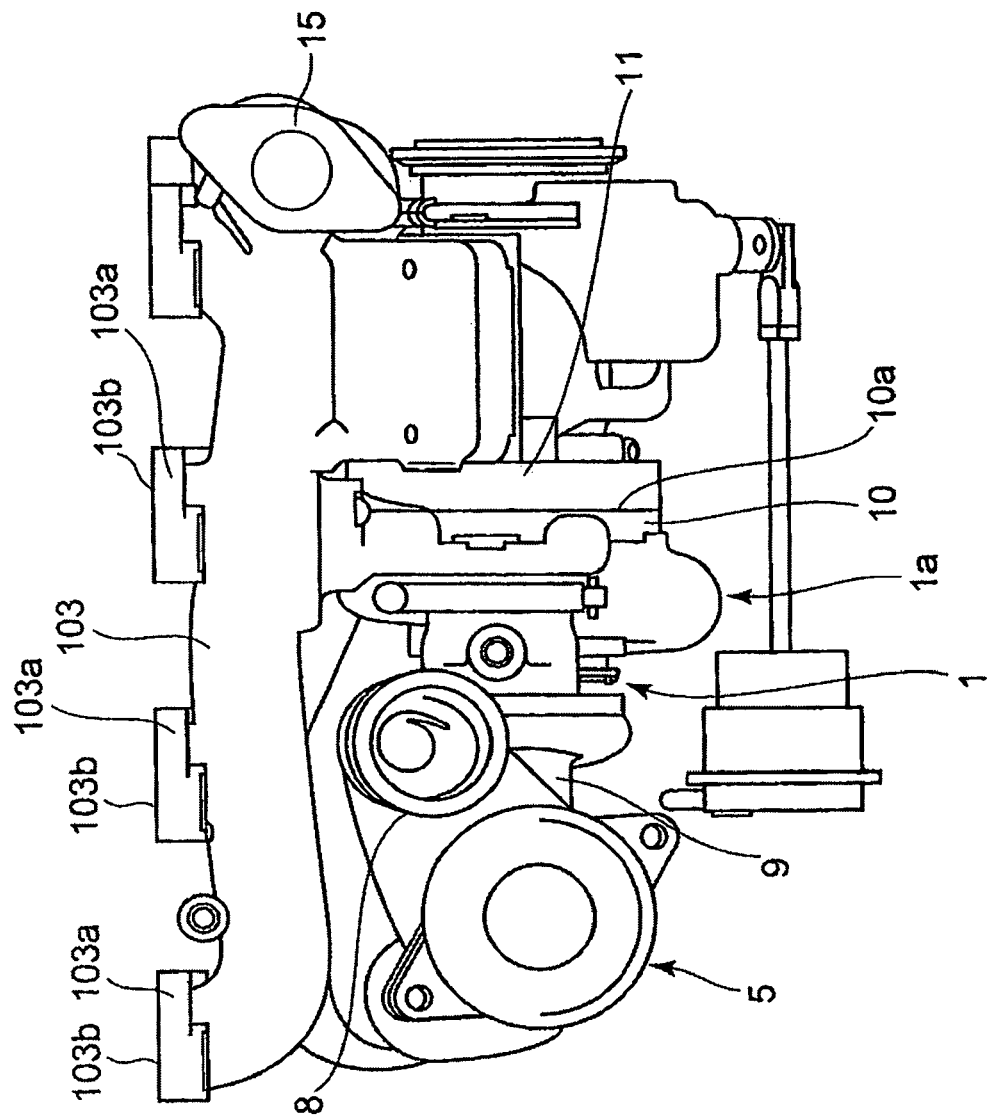
FIG. 2 is a plan view of the first embodiment of FIG. 1.
Figure 3:
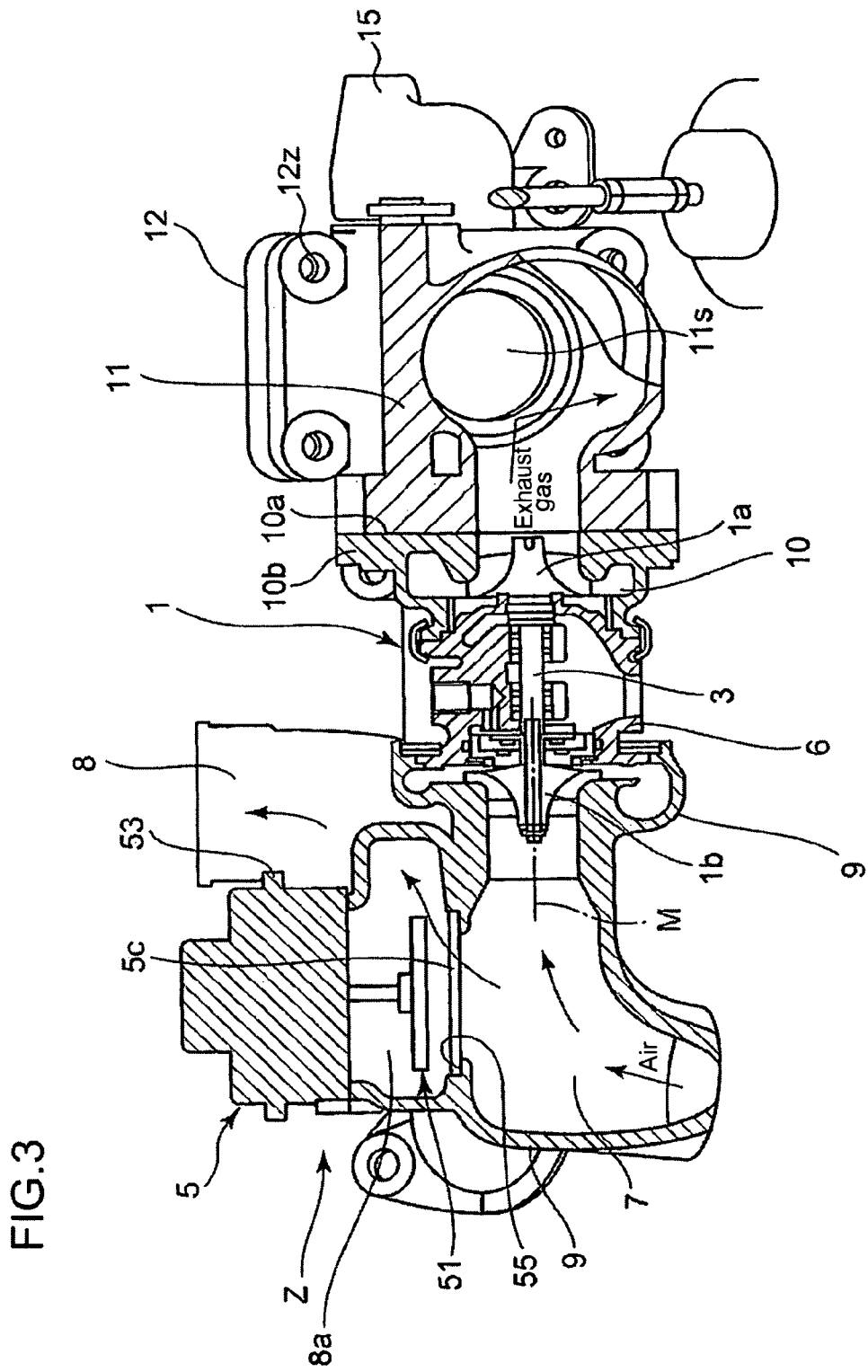
FIG. 3 is a sectional view of the first embodiment of FIG. 1 along the center line of the rotor shaft of the high-pressure stage turbocharger.

FIG. 1 is a side elevation showing the total construction of the first embodiment of the two-stage exhaust turbocharger according to the invention, FIG. 2 is a plan view of the first embodiment of FIG. 1, and FIG. 3 is a sectional view of the first embodiment of FIG. 1 along the center line of the rotor shaft of the high-pressure stage turbocharger.

Figure 4:
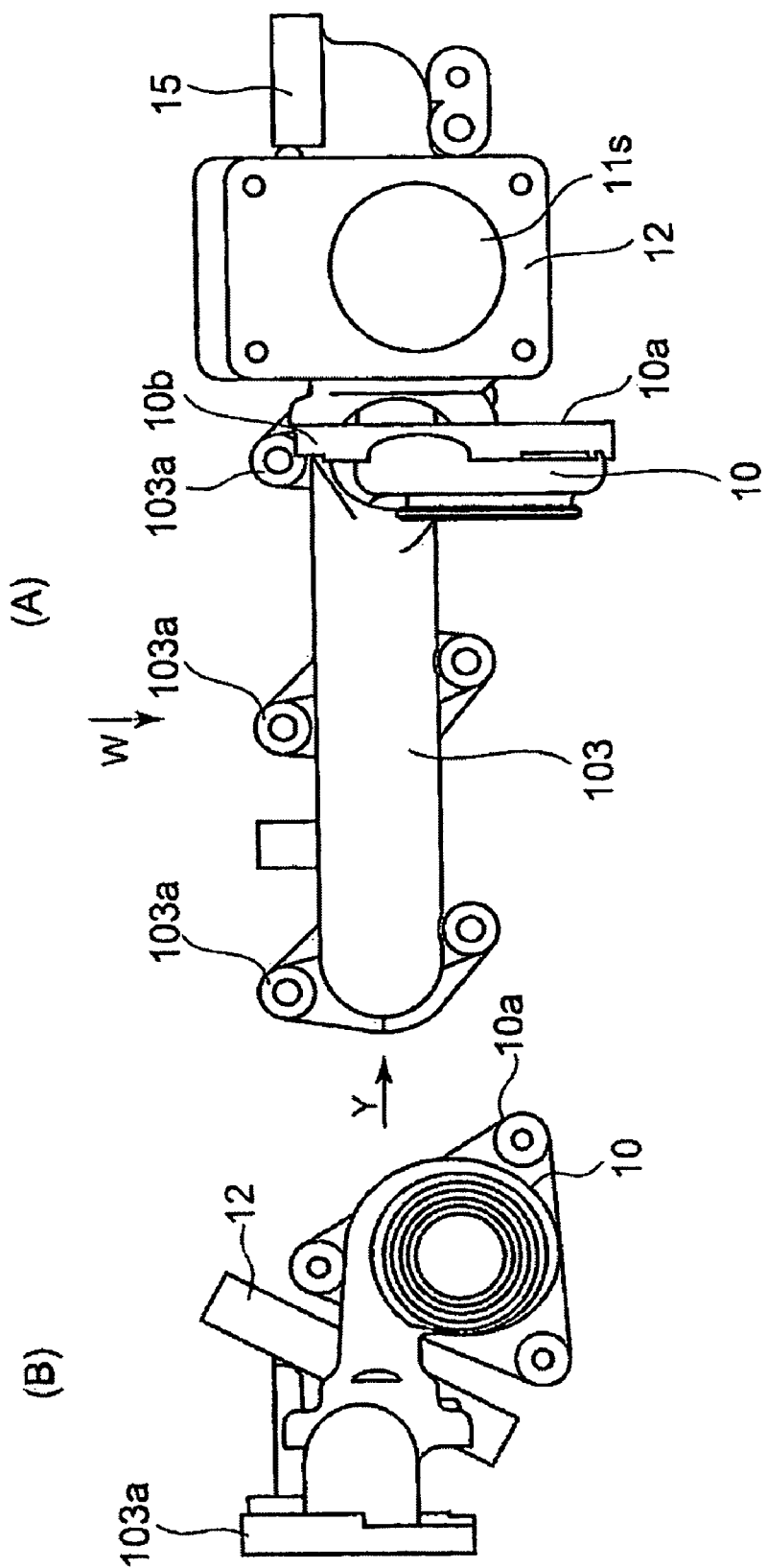
FIG. 4A is a side elevation showing the turbine housing of the high pressure stage exhaust turbocharger in the second embodiment of the invention.
FIG. 4B is a view in the direction of arrow Y in FIG. 4A.
Figure 5:
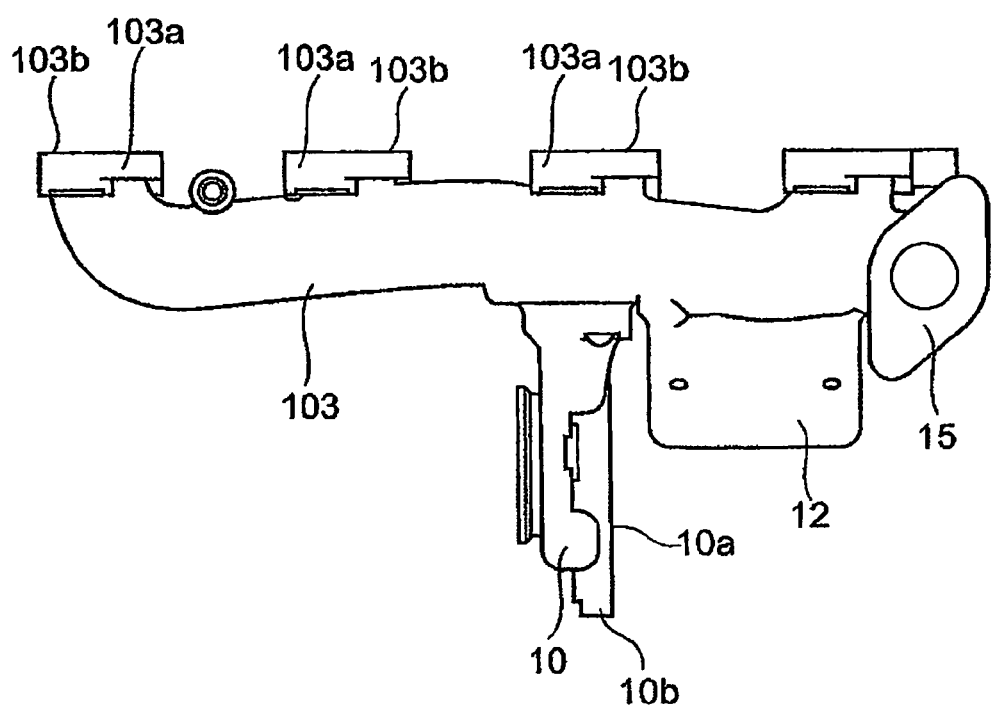
FIG. 5 is a view in the direction of arrow W in FIG. 4A.
Figure 6:
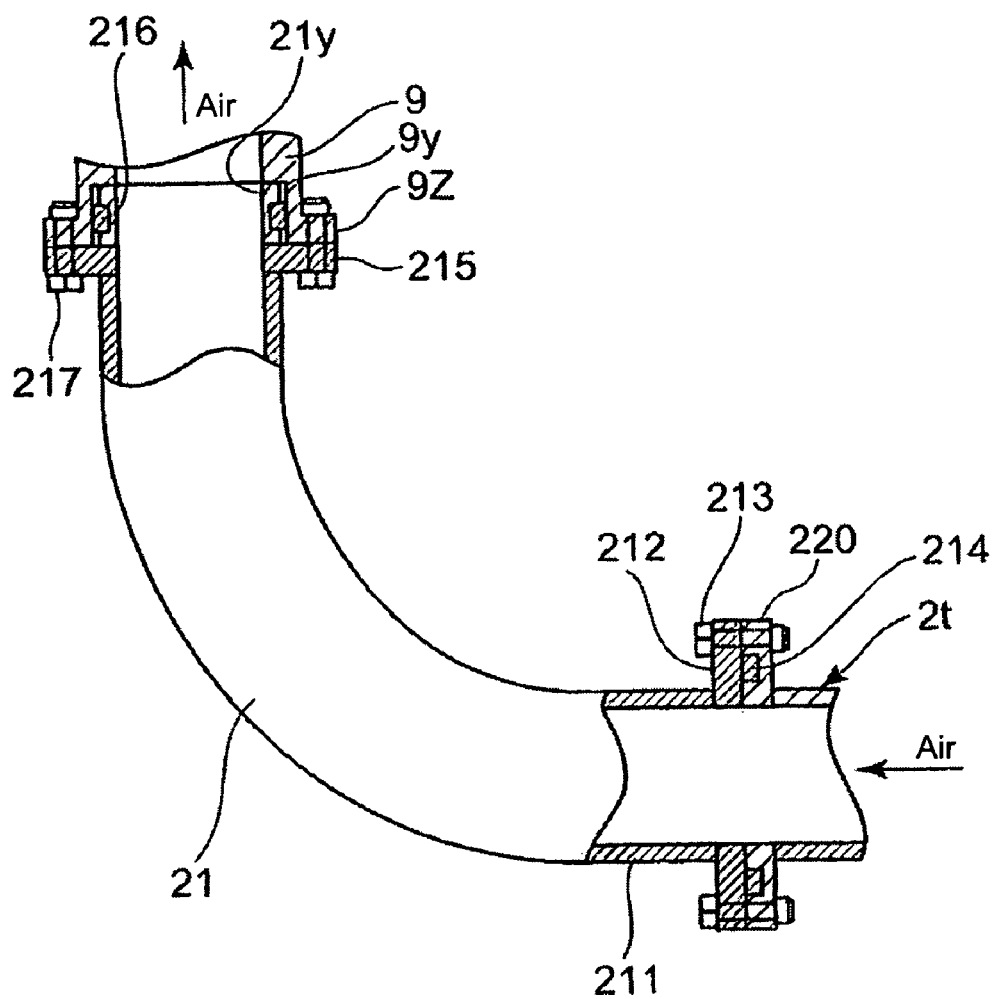
FIG. 6 is a partially sectional view of the air supply channel indicated by U in FIG. 1.

FIG. 4A is a side elevation showing the turbine housing of the high pressure stage exhaust turbocharger in the second embodiment of the invention, and FIG. 4B is a view in the direction of arrow Y in FIG. 4A. FIG. 5 is a view in the direction of arrow W in FIG. 4A, and FIG. 6 is a partially sectional view of the air supply channel indicated by U in FIG. 1.

Referring to FIGS. 1 to 5, reference numeral 1 is a high-pressure stage turbocharger having a high-pressure turbine 1*a* and a high-pressure compressor 1*b* connected to the turbine 1*a* by a high-pressure stage rotor shaft 3, 2 is a low-pressure stage turbocharger having a low-pressure turbine 2*a* and a low-pressure compressor 2*b* connected to the turbine by a low-pressure stage rotor shaft.

Reference numeral 10 is a high-pressure turbine housing of the high-pressure stage turbocharger 1, 9 is a high-pressure compressor cover, 11 is an exhaust channel. Reference numeral 2s is a low-pressure turbine housing of the low-pressure stage turbocharger 2, 2t is a low-pressure compressor cover.

Reference numeral 21 is an air supply channel connecting the low-pressure compressor cover 2t to the high-pressure compressor cover 9. The supply air channel 21 is detailed later.

In FIG. 3 showing the high-pressure stage turbocharger in longitudinal section, reference numeral 10 is a high-pressure turbine housing 10 of cast metal (may be of welded construction), 1a is a high-pressure turbine of radial flow type, 1b is a high-pressure compressor connected to the turbine 1a, 3 is a high-pressure stage rotor shaft connecting the turbine 1a and the compressor 1b, 9 is a high-pressure compressor made of cast metal, 6 is a high-pressure stage bearing housing made of cast metal.

Reference numeral 11 is an exhaust gas guide member made of cast metal, which is connected to a flange (10a indicates its flange face) of the high-pressure turbine housing 10 with the longitudinal center line of the channel coinciding the rotation axis M of the high-pressure turbine 1a by means of a plurality of bolts not shown in the drawing. The exhaust gas guide member 11 has a mounting flange 12 for connecting the low-pressure stage turbocharger 2b thereto. The mounting flange 12 extends in the direction parallel to the rotation axis M, and the low-pressure turbine housing 2s is connected directly to the flange 12 by means of a plurality of bolts (12z indicates a bolt hole) as shown in FIG. 1. Exhaust gas flowing out from the high-pressure turbine 1a is introduced to the entrance of the low-pressure turbine 2a passing through an exhaust gas passage 11s in the exhaust gas guide member 11 to the mounting flange of which is attached the low-pressure turbine 2a.

As shown in FIG. 3, the high-pressure compressor cover 9 has a compressor inlet passage 7 to which supply air is introduced from the low-pressure compressor 2b(see FIG. 1) via the air supply channel 21 and a bypass inlet passage 8a. A switching aperture 5c which is opened and closed by the compressor bypass valve device 5 is formed between the compressor inlet passage 7 and the bypass inlet passage 8a.

The high-pressure compressor cover 9 has also a bypass outlet pipe part 8 to which the compressor bypass channel 12 (8b) is to be connected. The bypass outlet pipe part 8 is formed integral with the compressor cover 9 in a form extending in a direction perpendicular to the rotation axis M adjacent a case 53 attached to the compressor cover 9, the compressor bypass valve device 5 being attached to the case 53.

The compressor bypass valve device 5 includes a compressor bypass valve 51 and an actuator 52 (not shown), and the switching aperture 5c is closed or opened by allowing the compressor bypass valve 51 to seat on or depart from a valve seat 55 formed on the peripheral part of the switching aperture 5c by reciprocation motion of the actuator to shut off or communicate the compressor inlet passage 7 from or to the bypass inlet passage, thereby shutting off or communicating the compressor inlet passage 7 to or from a compressor bypass channel not shown in the drawing.

A bypass outlet pipe part 8 is formed integral with the compressor cover 9 in a form extending in a direction perpendicular to the rotation axis M adjacent the compressor bypass valve device 5 installed to the compressor cover 9 as shown in FIG. 3.

Reference numeral 15 is an EGR flange formed integral with the exhaust gas guide member 11. A part of exhaust gas flowed out from the outlet of the high pressure turbine 1a is extracted from the exhaust gas flowing in the passage 11s and introduced to a supply air inlet pipe (not shown) by a conduit (not shown) attached to the EGR flange as exhaust recirculation gas.

Referring to FIGS. 2, 4A, 4B, and 5, reference numeral 103 is an exhaust manifold, which is formed integral with the high-pressure turbine housing 10 of the high-pressure stage turbocharger 1 and made by metal casting. The exhaust gas guide member 11 is connected to the flange face 10a of the flange 10b of the turbine housing 10 by a plurality of bolts not shown in the drawings with the longitudinal center line of the exhaust gas guide member 11 coinciding the rotation axis M of the high-pressure turbine 1a.

Reference numeral 103a is a flange of the exhaust manifold 103. The flange face 103b of each flange 103a is perpendicular to the flange face 10a of the flange 10b of the high-pressure turbine housing 10, and the exhaust manifold is fixed to the engine via the flanges 103a by means of a plurality of bolts not shown in the drawings.

Reference numeral 21 is an air supply channel bent to connect the low-pressure compressor cover 2t to the high-pressure compressor cover 9 and made of metal material, such as a steel pipe, and aluminum pipe, or a resin or hard rubber pipe having flexibility. The air supply channel 21 has an inlet flange 212 provided at its air inlet side. The flange 212 is fixed to a flange 220 of the low-pressure compressor cover 2t by means of a plurality of bolts 213 with a seal ring 214 placed between the flanges.

The air supply channel 21 has an outlet flange 215 provided at its air outlet side. The outlet flange 215 is fixed to a flange 9z of the high-pressure compressor cover 9 by means of a plurality of bolts 217. A protruded part 21y of the air supply channel 21 protruding from the flange 215 is received in a reception hole 9y of the high-pressure compressor cover 9 with an O-ring 216 placed between the protruding part 21y and the hole 9y for the purpose of air sealing.

When operating an engine equipped with the two-stage exhaust turbocharger at a low or middle rotation speed range with both the high-pressure stage turbocharger 1 and low-pressure stage turbocharger 2 being allowed to operate, a stage control valve not shown in the drawings is closed or its opening is controlled, and an exhaust bypass valve device not shown in the drawings and the compressor bypass valve device 5 are closed.

In this state, both the high-pressure turbine 1a of the high-pressure stage turbocharger 1 and the low-pressure turbine 2a of the low-pressure turbocharger 2 are driven by exhaust gas exhausted from the exhaust manifold 103. On the other hand, supply air pressurized by the low-pressure compressor 2b driven by the turbine 2a is further pressurized by the high-pressure compressor 1b driven by the high-pressure turbine 1a, then the pressurized supply air is cooled by an air cooler not shown in the drawings and supplied each of the cylinders of the engine as charge air for combustion in the cylinders.

Supercharge pressure can be increased to increase engine output by performing two-stage supercharging like this in a low, middle speed operating range of the engine.

When allowing the engine to operate in a single-stage supercharging state by the low-pressure stage turbocharger 2 in a high speed operating range by allowing the exhaust gas and supply air to bypass the high-pressure stage turbocharger 2, the stage control valve and the compressor bypass valve device 5 are opened and the opening of the exhaust bypass valve device is controlled so that desired pressure of charge air is produced.

In this mode of operation, most of the exhaust gas flowing out from the exhaust manifold 103 flows through a high-pressure exhaust bypass pipe not shown in the drawings to bypass the high-pressure turbine 1a and joins with a small portion of the exhaust gas flowed through the high-pressure turbine 1a to drive the low-pressure turbine 2a.

In this case, as the flow rate of the exhaust gas flowing through the high-pressure turbine 1a is very small, the high-pressure stage turbocharger 1 practically does not work.

On the other hand, most or all of the supply air pressurized by the low-pressure compressor 2b connected to the low-pressure turbine 2a bypasses the high-pressure compressor 1b by flowing through the bypass inlet passage 8a and the bypass outlet pipe part 8 of the high-pressure compressor cover 9 and joins with a small portion of the supply air flowed through the high-pressure compressor 1b to be supplied to the cylinders of the engine via the supply air inlet pipe not shown in the drawings.

By performing single-stage supercharging by the low-pressure stage turbocharger 2 by allowing most of the exhaust gas and supply air to bypass the high-pressure stage turbocharger 1, stable operation of the engine with high turbocharging efficiency is realized in a high speed operating range of the engine.

When assembling the two-stage exhaust turbocharger composed as mentioned above, the high-pressure turbine 1a, high-pressure compressor 1b, high-pressure bearing housing 6, high-pressure compressor cover 9, etc. are assembled to the high-pressure turbine housing 10 formed integral with the exhaust manifold 103 by casting or welding to compose the high-pressure stage turbocharger 1 using the flange face 10a of the flange 10b of the high-pressure turbine housing 10 as a reference plane, and the exhaust gas guide member 11 is attached to the flange 10b of by means of a plurality of bolts.

Then, the low-pressure stage turbocharger 2 comprising the low-pressure turbine 2a, low-pressure compressor 2b, low-pressure turbine casing 2s, low-pressure compressor cover 2t, etc. is assembled, and the low-pressure turbine housing 2s is fastened to the low-pressure turbine mounting flange 12 of the exhaust gas guide member 11 by means of a plurality of bolts (reference numeral 12z indicates a bolt hole).

In this way, the high-pressure stage turbocharger 1 and low-pressure stage turbocharger 2 are connected via the exhaust gas guide member 11.

Lastly, the O-ring 216 is attached to the air outlet end part 21y of the air supply channel 21, the end part 21y is inserted into the reception hole 9y, and the outlet flange 215 of the air supply channel 21 fastened to the flange 9z of the high-pressure compressor cover 9 are fastened by means of bolts 217. Then, the seal ring 214 is attached to the flange 220 of the low-pressure compressor cover 2t, and the inlet flange 212 of the air supply channel 21 is fastened to the flange 220 of the low-pressure compressor cover 2t.

In this way, the air supply pipe 21 is attached to connect between the high-pressure compressor cover 9 and the low-pressure compressor cover 2t in a state airtight connections are ensured.

According to the first embodiment, the high-pressure stage turbocharger 1 is assembled by attaching constituent part of the high pressure stage turbocharger including high pressure compressor cover 9 to the high-pressure turbine housing 10 which is formed integral with the exhaust manifold 103 by casting or welding, then the exhaust gas guide member 11 is attached to the high-pressure turbine housing 10, and then the low-pressure turbine housing 2s of the low-pressure stage turbocharger 2 is attached to the mounting flange 10 of the exhaust gas guide member 11, so the constituent parts of the high-pressure stage turbocharger 1 can be assembled easily by using the high-pressure turbine housing 10 formed integral with the exhaust manifold 103 as a reference plane, and the low-pressure stage turbocharger 2 is connected to the high-pressure stage turbocharger 1 without using any piping for connecting exhaust gas sides of the turbines such as an exhaust gas channel used in the prior art and with only one air supply channel 21 connecting between the high-pressure compressor cove Sand low-pressure compressor cover 2t, which connection being done at the last stage of assembling the turbochargers.

In addition, as the exhaust turbine sides, which are exposed to the high-pressure high-temperature exhaust gas, of the high-pressure and low-pressure stage turbochargers can be connected directly without providing any piping, a gas leakage-free connection can be facilitated as compared with connection by an exhaust channel.

Therefore, according to the first embodiment, connection of the turbine sides of the high-pressure stage turbocharger 1 and low-pressure stage turbocharger is facilitated resulting in decreased number of parts for the connection and decreased assembling man-hors as compared with the prior art.

Further, as connection of the high-pressure and low-pressure stage turbochargers with piping is reduced to only one, i.e. the connection with the air supply channel 21, as compared with two piping connections of the prior two-stage exhaust turbocharger, the bulk of the two-stage exhaust turbocharger device of the invention is reduced and mounting of an engine equipped with the two-stage exhaust turbocharger in a narrow engine room of a vehicle is facilitated.

The Second Embodiment

Figure 7:
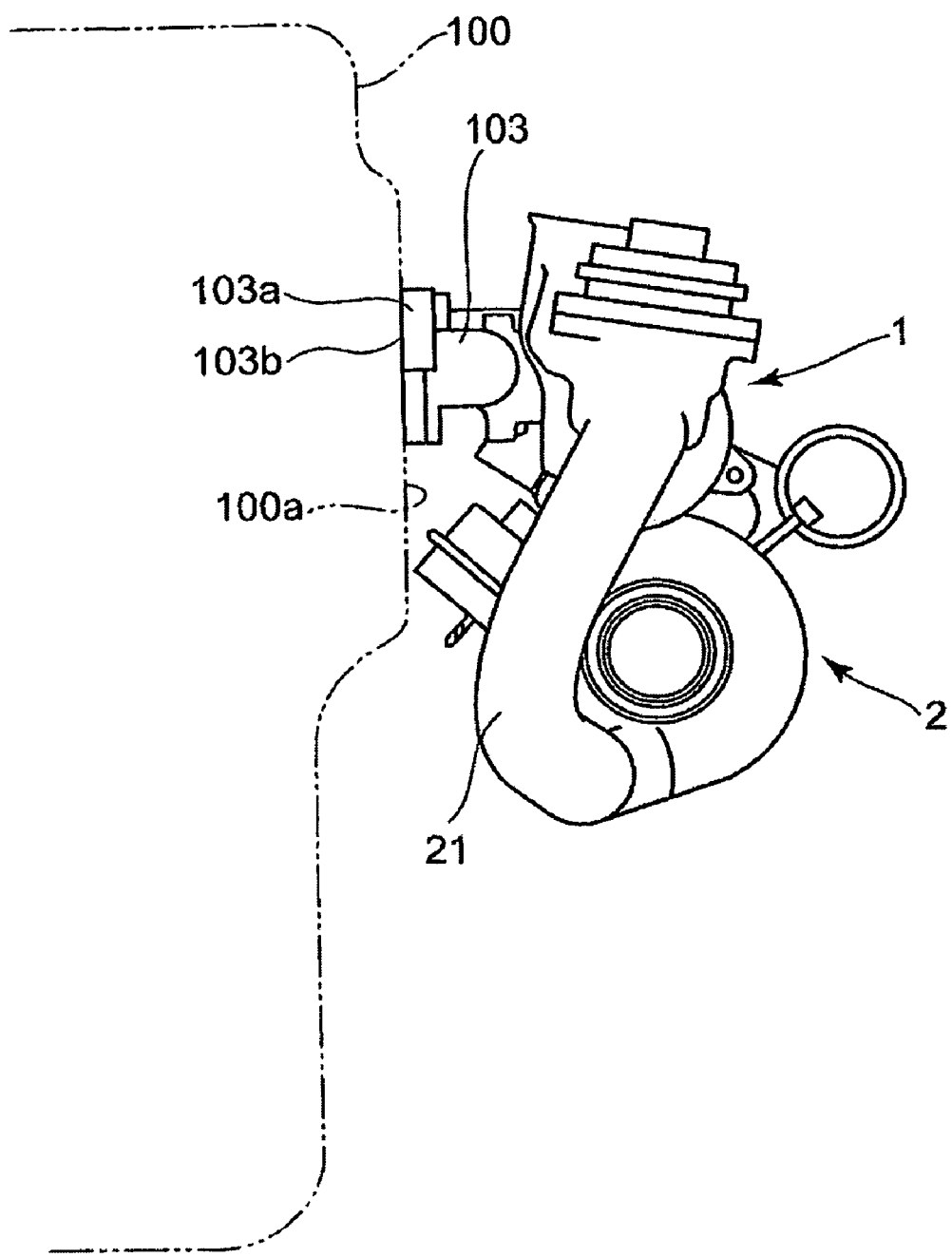
FIG. 7 is a view of second embodiment of the two-stage exhaust turbocharger according to the invention in axial direction of the engine equipped with the turbocharger.

FIG. 7 is a front view of second embodiment of the two-stage exhaust turbocharger in axial direction of the engine equipped with the turbocharger.

The second embodiment relates to another method of attaching the two-stage exhaust turbocharger composed similar to that of the first embodiment to one side of an engine.

The exhaust manifold 103 and the high-pressure turbine housing 10 are formed integral by casting or welding such that the flange faces 103b of the flanges 103a of the exhaust manifold 103 to attach the manifold to the engine is substantially perpendicular to the flange face 10a of the exhaust gas outlet flange 10b of the turbine housing 10 in the same way as is done in the first embodiment as shown in FIG. 5.

Then, the high-pressure turbine 1a, high-pressure compressor 1b, high-pressure bearing housing 6, high-pressure compressor cover 9, etc. are assembled to the high-pressure turbine housing 10 formed integral with the exhaust manifold 103 by casting or welding to compose the high-pressure stage turbocharger 1 using the flange face 10a of the flange 10b of the high-pressure turbine housing 10 as a reference plane, and the exhaust gas guide member 11 is attached to the flange 10b of by means of a plurality of bolts, in the same way as is done in the first embodiment.

Then, the exhaust gas guide member 11 is attached to the high-pressure turbine housing 10, and the exhaust manifold 103 attached with the high-pressure stage turbocharger 1 is attached to an exhaust gas outlet side of the engine by fastening the flanges 103a of the manifold 103 to the engine.

Then, the low-pressure stage turbocharger 2 comprising the low-pressure turbine 2a, low-pressure compressor 2b, low-pressure housing 2s, low-pressure compressor cover 2t, etc. is assembled and attached to the low-pressure mounting flange 12 of the exhaust gas guide member 11 by fastening the low-pressure turbine housing 2s to the flange 12 by means of a plurality of bolts.

In this way, the two-stage turbocharger is attached to one side of the engine 100 in a state the low-pressure stage turbocharger 2 is located below the high-pressure stage turbocharger 1 as shown in FIG. 7.

Lastly, the O-ring 216 is attached to the air outlet end part 21y of the air supply channel 21, the end part 21y is inserted into the reception hole 9y, and the outlet flange 215 of the air supply channel 21 fastened to the flange 9z of the high-pressure compressor cover 9 are fastened by means of bolts 217. Then, the seal ring 214 is attached to the flange 220 of the low-pressure compressor cover 2t, and the inlet flange 212 of the air supply channel 21 is fastened to the flange 220 of the low-pressure compressor cover 2t, in the same way as is done in the first embodiment as shown in FIG. 6.

In this way, the air supply pipe 21 is attached to connect between the high-pressure compressor cover 9 and the low-pressure compressor cover 2t in a state airtight connections are ensured.

According to the second embodiment, first the exhaust manifold 103 attached with the high-pressure stage turbocharger 1 is fastened to the engine and then the low-pressure stage turbocharger 2 is attached to the engine, so a relatively light sub-assembly of the exhaust manifold 103 and the relatively small high-pressure stage turbocharger 1 is attached to one side of the engine and then the relatively large and heavy low-pressure stage turbocharger 2 is attached to the sub-assembly already attached to the engine, the attaching operation is facilitated, resulting decreased man-hours of attaching the two-stage turbocharger to the engine.

INDUSTRIAL APPLICABILITY

According to the invention, a method of manufacturing a multistage exhaust turbocharger decreased in the number of parts for connecting the high-pressure and low-pressure stage turbochargers of the multistage exhaust turbocharger can be provided, and an engine equipped with the multistage exhaust turbocharger reduced in bulk and easily mountable in a narrow engine room of a vehicle can be obtained.

The invention claimed is:

1. A method of manufacturing a multistage exhaust turbocharger for an internal combustion engine, the multistage exhaust turbocharger including a high-pressure stage turbocharger having a high-pressure turbine drivable by exhaust gas from an exhaust manifold of the engine, and a low-pressure stage turbocharger having a low-pressure turbine drivable by exhaust gas flowed out from the high-pressure turbine after driving the high-pressure turbine, said method comprising:

providing a high-pressure turbine housing of the high-pressure stage turbocharger, the high-pressure turbine housing being integrally formed with the exhaust manifold by casting;

assembling constituent parts of the high-pressure stage turbocharger using the high-pressure turbine housing as a reference;

after said assembling constituent parts of the high-pressure stage turbocharger, attaching the low-pressure stage turbocharger to the high-pressure stage turbocharger by attaching a low-pressure turbine housing to a low-pressure turbine connection flange provided at an exhaust outlet side of the high-pressure stage turbocharger; and after said attaching the low-pressure stage turbocharger, attaching an air supply channel to connect between a supply air outlet of the low-pressure stage turbocharger and a supply air inlet of the high-pressure stage turbocharger, wherein the high-pressure stage turbocharger has a rotation axis, wherein the low-pressure stage turbocharger is disposed below the high-pressure stage turbocharger when viewed in a direction parallel to the rotation axis of the high-pressure stage turbocharger, wherein the high-pressure stage turbocharger and the low-pressure stage turbocharger are arranged sequentially in the flow path of the exhaust gas of the engine, wherein the high-pressure stage turbocharger has a high-pressure compressor and the low-pressure stage turbocharger has a low-pressure compressor, and wherein the air supply channel supplies supply air for the engine pressurized by the low-pressure compressor to the high-pressure compressor to be further pressurized by the high-pressure compressor.

2. The method of claim 1, wherein the high-pressure stage turbocharger includes:

a high-pressure compressor cover accommodating the high-pressure compressor, the high-pressure compressor cover including the supply air inlet of the high-pressure stage turbocharger;

an exhaust gas guide member having a low-pressure turbine connection flange for connecting the high-pressure turbine housing and the low-pressure turbine housing; and an exhaust gas outlet flange on the high-pressure turbine housing, wherein the low-pressure stage turbocharger includes a low-pressure compressor cover accommodating the low-pressure compressor, the low-pressure compressor cover including the supply air outlet of the low-pressure stage turbocharger, and wherein the exhaust gas guide member is attached to the exhaust gas outlet flange of the high-pressure turbine housing, then the low-pressure turbine housing is attached to the low-pressure turbine connection flange of the exhaust gas guide member, and then the air supply channel is attached between the supply air outlet of the low-pressure stage turbocharger and the supply air inlet of the high-pressure stage turbocharger.

3. The method of claim 1, wherein the high-pressure stage turbocharger includes an exhaust gas guide member, and the low-pressure stage turbocharger is connected to the exhaust gas guide member, wherein assembled at one side of the engine are the exhaust manifold formed integrally with the high-pressure turbine housing, the high-pressure stage turbocharger, and the low-pressure stage turbocharger, in order from the top side.

4. The method of claim 1, wherein the high-pressure stage turbocharger and the high-pressure turbine housing are attached to the engine, and then the low-pressure stage turbocharger is attached to the high-pressure stage turbocharger.

5. The method of claim 1, wherein the low-pressure stage turbocharger is disposed below the high-pressure stage turbocharger in a vertical direction which is perpendicular to the rotation axis of the high-pressure stage turbocharger.

6. The method of claim 1, further comprising mounting the exhaust turbocharger at one side of the engine in a lateral direction of the engine with the rotation axis of the high-pressure stage turbocharger being parallel to the axial direction of the engine, wherein the low-pressure stage turbocharger is disposed below the high-pressure stage turbocharger in a vertical direction of the engine which is perpendicular to the axial direction of the engine and perpendicular to the lateral direction of the engine.

7. The method of claim 1, wherein the low-pressure stage turbocharger is disposed below the high-pressure stage turbocharger when viewed in an axial direction of the engine without the low-pressure stage turbocharger and the high-pressure stage turbocharger being on the same axis of the engine.

8. The method of claim 1, wherein a rotation axis of the low-pressure stage turbocharger is offset from the rotation axis of the high-pressure stage turbocharger in a vertical direction perpendicular to the rotation axis of the high-pressure stage turbocharger.

* * * * *